Nov. 22, 1960 C. W. MARLOW 2,961,055
GARDEN TRACTOR CONTROL AND PLOW GUIDE ATTACHMENT
Filed Feb. 10, 1959 2 Sheets-Sheet 1

Chester W. Marlow
INVENTOR.

Nov. 22, 1960     C. W. MARLOW     2,961,055
GARDEN TRACTOR CONTROL AND PLOW GUIDE ATTACHMENT
Filed Feb. 10, 1959     2 Sheets-Sheet 2
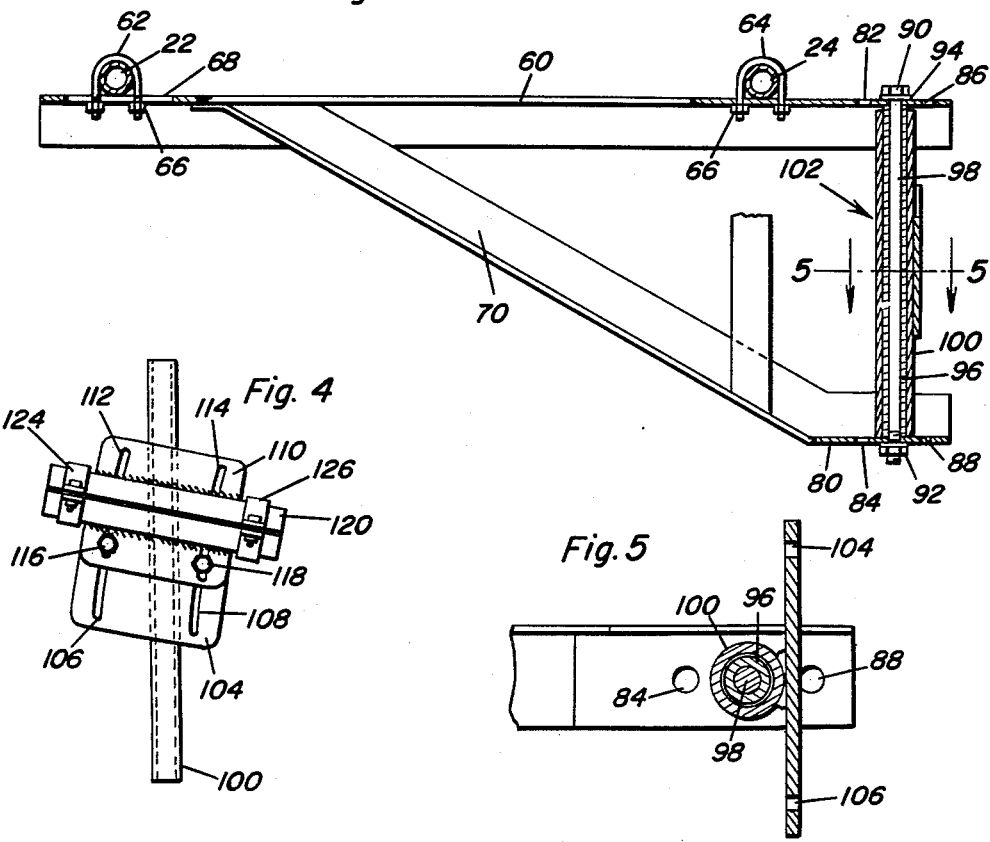
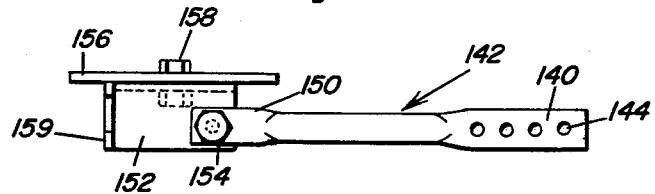
Chester W. Marlow
INVENTOR.

# United States Patent Office 2,961,055
Patented Nov. 22, 1960

2,961,055

GARDEN TRACTOR CONTROL AND PLOW GUIDE ATTACHMENT

Chester W. Marlow, Duncanville, Ala.

Filed Feb. 10, 1959, Ser. No. 792,338

4 Claims. (Cl. 172—333)

This invention relates in general to an agricultural equipment and more particularly to an attachment to be utilized with small farm or garden type tractors for facilitating control of the plow thereof.

When working the land, on small farms or large gardens, it is common practice to utilize small manually controlled tractors which are driven by, generally, one cylinder gasoline engines. Conventionally, these tractors include a frame having a pair of rigidly attached handles and a pair of rotatable ground wheels dependingly supported from the frame. A plow implement is generally rigidly supported between, and to the rear of, the ground wheels. In use, a person walks behind the tractor and balances the tractor on the pair of ground wheels by grasping the rigidly attached spaced handles. The plow implement is in contact with the ground and the entire tractor is motivated by the gasoline engine. In order to plow straight rows, it is only necessary that the farmer balance the tractor and allow the engine to carry the tractor forward on the ground wheels. However, experience has indicated that for special plowing purposes it is desirable for the farmer to be able to exercise control over the plow implement independently of the directional movement of the tractor. Also, it has been found that independent control of the plow implement facilitates the turning of the plow.

Accordingly, it is the principal object of this invention to provide a novel attachment for garden tractors whereby the plow implement may be independently controlled.

It is a further object of this invention to provide a novel attachment for garden tractors wherein said attachment includes a pivotally mounted handle for transversely moving a plow implement.

It is a still further object of this invention to provide a novel attachment for garden tractors for facilitating turning movement thereof.

It is a still further object of this invention to provide a novel attachment for garden tractors which allows an operator to selectively move the plow implement for utilizing said plow implement to turn said tractor.

It is a still further object of this invention to provide a novel attachment for garden tractors which includes an auxiliary handle for facilitating control of the tractor, said handle being adjustably positioned whereby operators of varying heights will find it easily manipulative.

It is a still further object of this invention to provide a novel attachment for garden tractors which is relatively inexpensive to produce and install on conventional tractor devices.

Other objects, and advantages which will become apparent reside in the details of construction and operation as more fully hereinafter described and claimed, reference being had to the accompanying drawings forming a part hereof, wherein like numerals refer to like parts throughout, and in which:

Figure 1 is a side elevational view of the invention shown being utilized with a conventional garden tractor;

Figure 2 is a rear elevational view, partially broken away, of the invention shown being utilized with a conventional garden tractor;

Figure 3 is an enlarged elevational view partially broken away of the brace and pivot housing;

Figure 4 is an enlarged elevational view of the attaching means between the auxiliary handle and the pivot housing;

Figure 5 is a sectional view taken substantially along the plane 5—5 of Figure 3; and Figure 6 is an enlarged elevational plan view of the connecting rod.

With continuing reference to the drawings, the numeral 10 generally represents a conventional tractor including a pair of ground wheels 12 and 14, a frame 16 including a front flat platform 18 and axle 20 connecting the wheels 12 and 14, a pair of spaced rigidly attached handles 22 and 24, and a pair of plates 26 and 28 rigidly attaching said handles 22 and 24 to a housing 30. The housing 30 is attached to the frame 16 and includes a first pulley 32 having an endless belt 34 entrained therearound. The endless belt 34 is driven by shaft 36 of gasoline engine 38 having a gasoline reservoir 40. The pulley 32 drives axle 20 through endless belts 39.

A tool bar 42 is pivotally supported from platform 18 by a bolt 44 passing through aligned apertures in the tool bar 42 and platform 18 and retained by nut 46. Appropriate washers 48 are utilized in conjunction with the nut and bolt 46 and 44, respectively. Clamping means 50 at the rear of the tool bar 42 securely holds a tool or plow implement 52 whereby the tool point 54 is adapted to engage the ground 56.

A brace 58 including a first transverse angle iron 60 is secured by U-shaped clamps 62 and 64, held by nuts 66, to the handles 22 and 24 respectively. It will be noted that the legs of the U-shaped clamp 64 pass directly through apertures in the angle iron 60. However, the legs of U-shaped clamp 62 pass through a slotted portion 68 rather than apertures. Since the rigidly attached handles 22 and 24 diverge toward the rear of the tractor device, the slot 68 in the angle iron 60 must be provided so that the brace 58 may be supported at various portions along the length of the handles 22 and 24. An angle iron member 70 diagonally depends from the member 60. Further, a pair of angle iron braces 72 and 74 extend from the member 70 and are secured to the handle 24 by U-shaped clamps 76 and 78 respectively.

The angle member 70 which is diagonally dependingly supported from angle member 60 terminates in a horizontal portion 80 which is formed parallel to the angle member 60. Aligned apertures as at 82 and 84 and 86 and 88 are provided in the superposed elements 60 and 80 for passing a bolt 90 therethrough retained by a nut 92 and appropriate washers 94. Though, as in Figure 3, the bolt 90 passes through a particular pair of aligned apertures in the elements 60 and 80, it will of course be apparent that the bolt 90 is adapted to be inserted through any of the three pairs of aligned apertures. A bearing 96 is held about the shank portion 98 of the bolt 90. A sleeve 100 surrounds the bearing 96 and is adapted to rotate thereabout. It is to be noted that the sleeve 100 is shorter than the bearing 96 so that the bearing 96 may be tightly clamped in position without binding the sleeve 100 and impairing its rotation. The combination of bolt 90, bearing 96, and sleeve 100, may broadly be referred to as the pivot housing 102. Particularly referring to Figure 4, it will be noted that a first plate 104 having arcuate slots 106 and 108 therein is fixed to the sleeve 100 as by welding. A second plate 110 having arcuate apertures 112 and 114 is superposed over the first plate 104 with the arcuate slots 106 and 112 and 108 and 114 in registry. Bolts 116 and 118 pass through the registered arcuate slots for confining the slidable path of the plates 104 and 110 relative to each other. A split sleeve 120 is welded to the plate 110 and passing through the sleeve is an auxiliary handle 122. Clamps 124 and 126 are carried on the sleeve 120 for compressing the sleeve so as to fix the sleeve to the auxiliary handle 122 at any point therealong. It should be apparent that the auxiliary bar 122, is now so supported relative to the brace 58, so that it may pivot about an axis defined by the bolt 90, or may be raised or lowered as the plates 104 and 110 slide relative to each other. It is here to be noted that the plates 104 and 110 may be retained in selective position by tightening the bolts 116 and 118.

The auxiliary handle 122 terminates in a bifurcated portion 130 which receives a tongue 132 or link 134. A pivot pin 136 passes through the bifurcated portion 130 and tongue 132 to allow the auxiliary handle 122 to pivot about the horizontal axis defined by the pin 136. The link 134, in turn, terminates in a bifurcated portion 138 which is adapted to receive tongue portion 140 of connecting rod 142. It is noted that the tongue portion 140 of connecting rod 142 has a plurality of apertures 144 which are adapted to be aligned with apertures passing through the bifurcated portion 138 of link 134 so that a bolt 146 may be passed therethrough and retained by nut 148. Thus far, it should be apparent that as the auxiliary handle 122 is pivoted about the axis defined by the bolt 90, the connecting rod 142 may be moved transversely to the path of movement of the tractor 10. The connecting rod 142 terminates in a bifurcated portion 150 which receives a projection 152 therebetween. The projection 152 is pivotally retained in the bifurcated portion 150 of connecting rod 142 by a bolt 154 retained by nut 157. The projection 152 is retained perpendicular to a flat plate 156 by a bolt 158 which securely fastens a leg 160, formed integral with the projection 152, to the plate 156. A fork member 159 is fixed on the projection 152 and is adapted to receive links of chains 161, 163, terminal fastened to a U-shaped guide 164 for limiting the transverse movement of the plate 156 and attached tool bar 42.

A transverse bar 162 is secured between rigidly attached handles 22 and 24. The U-shaped guide 164 is dependingly secured to the bar 162. The flat plate 156 supports a plurality of rollers 166 from the rear surface thereof. As particularly shown in Figures 1 and 2, the rollers 166 are adapted to ride on the horizontal lower portion 168 of the U-shaped guide 164. The tool bar 42 is preferably welded to the plate 156.

The operation and utilization of the device should now be apparent. It will be seen that an operator standing behind the tractor 10 may move the tool bar 42 and tool 52 by moving the auxiliary handle 122 to the left and right, pivoting the auxiliary handle 122 about the pivot housing 102. The connecting rod 142 will be moved transversely relative to the path of movement of the tractor 10 and the tool 52 will be moved accordingly. The attaching means between the auxiliary handle 122 and pivot housing 102 allow the operator to adjust the level of the auxiliary handle 122 for fitting the attachment to the particular operator. Also, a change in leverage and mechanical advantages may be afforded by the angular adjustment of the auxiliary handle 122.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination with a translatable frame having at least one control handle connected thereto, of a tool bar pivotally suspended from said frame, a ground engaging tool carried by said tool bar, an elongated auxiliary handle, a sleeve member surrounding said auxiliary handle, means attaching said sleeve to said auxiliary handle at selected positions along said auxiliary handle, means supporting said sleeve for pivotal movement relative to said control handle, one end of said auxiliary handle being adjacent and extending alongside said control handle and adapted for movement in a generally horizontal plane toward and away from said control handle, and attaching means pivotally connecting the other end of said auxiliary handle to said tool bar whereby the tool bar is moved transversely of the direction of travel of said frame upon movement of said one end of the auxiliary handle in a generally horizontal plane.

2. The combination defined in claim 1 in which the means supporting the sleeve comprises a first vertical plate mounted on said frame for pivotal movement in a generally horizontal plane, a second vertical plate secured to said sleeve, said first plate and said second plate being positioned adjacent each other in face to face relationship, and adjustable means securing said plates to each other at selected positions relative to each other.

3. The combination defined in claim 2 in which said first and second plates are provided with arcuate slots therein in registry with each other and said means securing said platen to each other includes retaining bolts positioned in said arcuate slots.

4. An attachment for garden tractors including a frame with handles rigidly attached thereto for facilitating control of the tractor comprising a tool bar pivotally suspended from said frame, a tool adapted to contact the ground rigidly carried by the tool bar, means suspended from said rigidly attached handles for selectively pivoting said tool bar, said means including an auxiliary handle rotatably supported relative to said frame, connecting means pivotally attached between the end of said auxiliary handle and said tool bar, said connecting means including a connecting rod pivotally and terminally attached to said auxiliary handle, a flat plate pivotally attached to said connecting rod and fixed to said tool bar, a U-shaped guide suspended from said frame, and rollers fixed to said flat plate cooperating with said guide for confining the path of movement of said tool bar.

References Cited in the file of this patent

UNITED STATES PATENTS

| | | |
|---|---|---|
| 144,099 | Hopkins | Oct. 28, 1873 |
| 542,614 | Lawrence | July 9, 1895 |
| 1,039,581 | Newsome | Sept. 24, 1912 |
| 1,429,946 | Hodge | Sept. 26, 1922 |
| 1,806,728 | Willits | May 26, 1931 |
| 2,322,268 | Zink et al. | June 22, 1943 |
| 2,368,290 | Donald | Jan. 30, 1945 |
| 2,597,622 | Davis | May 20, 1952 |